US011807374B2

(12) United States Patent
Berjot et al.

(10) Patent No.: US 11,807,374 B2
(45) Date of Patent: Nov. 7, 2023

(54) AIRCRAFT PROPULSION ASSEMBLY COMPRISING A THRUST FORCE UPTAKE DEVICE

(71) Applicant: Airbus Operations (S.A.S.), Toulouse (FR)

(72) Inventors: Michael Berjot, Toulouse (FR); Thomas Robiglio, Toulouse (FR); Karla Mariana Arellanes Mendoza, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/947,273

(22) Filed: Sep. 19, 2022

(65) Prior Publication Data

US 2023/0113400 A1    Apr. 13, 2023

(30) Foreign Application Priority Data

Sep. 20, 2021   (FR) ........................................ 2109869

(51) Int. Cl.
*B64D 27/26*       (2006.01)
*F02C 7/20*        (2006.01)

(52) U.S. Cl.
CPC ................ *B64D 27/26* (2013.01); *F02C 7/20* (2013.01); *B64D 2027/268* (2013.01)

(58) Field of Classification Search
CPC .......................... B64D 27/26; B64D 2027/268
See application file for complete search history.

(56) References Cited

U.S. PATENT DOCUMENTS

| 3,844,115 A | * | 10/1974 | Freid | .......................... | F02C 7/20 |
| | | | | | 244/54 |
| 5,725,181 A | * | 3/1998 | Hey | ........................ | B64D 27/18 |
| | | | | | 60/797 |

(Continued)

FOREIGN PATENT DOCUMENTS

| EP | 3792182 A1 | 3/2021 | | |
| FR | 2887850 A1 | * | 1/2007 | ............. B64D 27/18 |

(Continued)

OTHER PUBLICATIONS

French Search Report for Application No. 2109869 dated May 18, 2022.

*Primary Examiner* — Todd E Manahan
*Assistant Examiner* — Marc J Amar
(74) *Attorney, Agent, or Firm* — KDW Firm PLLC (57) ABSTRACT

A propulsion assembly includes an engine below a pylon by engine attachments, including a thrust force uptake device, the engine having a longitudinal axis and a vertical median plane parallel to the longitudinal axis, the thrust force uptake device having a main fitting fixed below the pylon and two links disposed on either side of the vertical median plane and which each have a rear end articulated to the main fitting by a spreader mounted to pivot on the main fitting about an axis of rotation which, on the one hand, is orthogonal to a mean plane for transmitting thrust forces parallel to the longitudinal axis of each of the links, and which is disposed in the vertical median plane, each link being articulated to the spreader by a connecting pin extending parallel to the mean plane for transmitting thrust forces and perpendicular to the longitudinal axis of the link.

5 Claims, 5 Drawing Sheets

(56) References Cited

U.S. PATENT DOCUMENTS

| | | | |
|---|---|---|---|
| 5,873,547 A * | 2/1999 | Dunstan | B64D 27/26 |
| | | | 60/797 |
| 7,108,224 B2 | 9/2006 | Pasquer et al. | |
| 7,607,609 B2 | 10/2009 | Levert | |
| 10,597,144 B2 * | 3/2020 | Fotouhie | B64C 15/12 |
| 2005/0067528 A1 * | 3/2005 | Loewenstein | B64D 27/26 |
| | | | 244/54 |
| 2008/0224018 A1 * | 9/2008 | Lafont | B64D 27/26 |
| | | | 248/554 |
| 2009/0200419 A1 * | 8/2009 | Levert | B64C 27/26 |
| | | | 244/54 |
| 2009/0294580 A1 * | 12/2009 | Sammito | B64D 27/26 |
| | | | 244/54 |
| 2010/0127118 A1 * | 5/2010 | Combes | B64D 27/26 |
| | | | 60/797 |
| 2013/0327058 A1 * | 12/2013 | Balk | B64D 27/18 |
| | | | 60/797 |
| 2016/0215654 A1 * | 7/2016 | Ancuta | F01D 25/28 |
| 2016/0221682 A1 * | 8/2016 | Pautis | B64D 27/18 |

FOREIGN PATENT DOCUMENTS

| | | | | |
|---|---|---|---|---|
| GB | 2010969 A * | 7/1979 | | B64D 27/18 |
| JP | 2004 352232 A | 12/2004 | | |

\* cited by examiner

AIRCRAFT PROPULSION ASSEMBLY COMPRISING A THRUST FORCE UPTAKE DEVICE

TECHNICAL FIELD

The subject matter herein relates to an aircraft propulsion assembly comprising a device for taking up thrust forces generated by an engine fixed below a pylon by engine attachments.

BACKGROUND

Patent application EP3792182 discloses a propulsion assembly which comprises, at the front, taking the direction of travel of the aircraft through the air as a reference, a front engine attachment, at the rear, a rear engine attachment, and between the two engine attachments, a device for taking up thrust forces of the engine.

Figure 1:
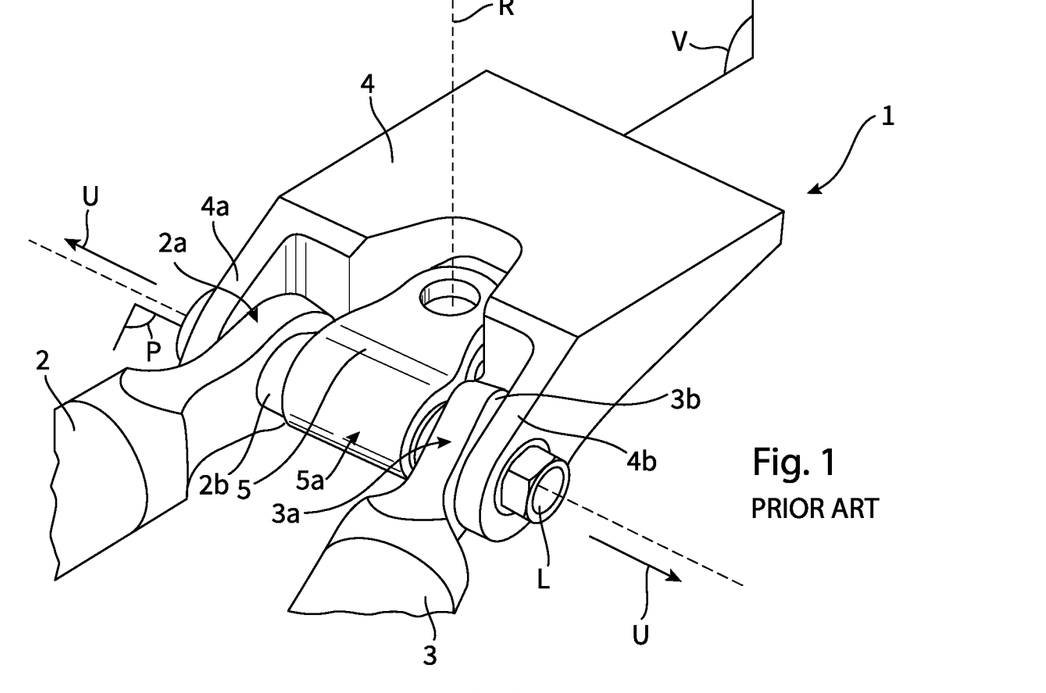
FIG. 1 is a perspective view of a thrust force uptake device according to the prior art.

With reference to FIG. 1, the thrust force uptake device 1 described in the above-mentioned application comprises two thrust links 2, 3 which are disposed on either side of a vertical median plane V of the propulsion assembly and which each have a front end attached to the engine and a rear end 2a, 3a articulated to a main fitting 4 by a spreader 5. The spreader 5 is mounted so as to pivot on the main fitting 4 about an axis of rotation R disposed in the vertical median plane V and orthogonal to a mean plane P for transmitting thrust forces comprising the longitudinal axes of the two links 2, 3. The spreader 5 is arranged between two arms 4a, 4b of the main fitting 4, the arms being symmetrical in relation to one another with respect to the vertical median plane V.

The two links 2, 3 are fixed to the spreader 5 by a single connecting pin L which is mounted horizontally and is disposed in the mean plane P for transmitting forces and orthogonal to the axis of rotation R. The connecting pin L is inserted in a bearing 5a of the spreader 5 and on each side of the latter, through a ball joint ring mounted at the rear end 2a, 3a of each link 2, 3. The connecting pin L mechanically connects, on the one hand, the links to the spreader 5 without play, and, on the other hand, the links to the main fitting 4 with play by the two arms 4a, 4b of the main fitting 4.

Such a thrust force uptake device 1 is advantageous in that the mounting of the links 2, 3 by a horizontally mounted connecting pin L makes it possible to optimize the compactness and the operators' access from the left and right sides of the propulsion assembly.

However, the design of such a thrust force uptake device 1 leads to out-of-plane forces directed towards the side and the exterior of the device (forces along the arrows U in FIG. 1) at each interface of a link 2, 3 with the spreader 5, and these out-of-plane forces may, ultimately, give rise to premature wear of the ball joint rings.

Consequently, there is a need to modify the design of the force uptake device as described above in order to remedy this drawback, while still retaining a mounting of the links by a horizontally mounted connecting pin.

SUMMARY

The subject matter herein aims to completely or partially meet this need. To this end, a subject of the subject matter herein is a propulsion assembly comprising an engine suspended below a pylon by engine attachments comprising, at the front, a front engine attachment, at the rear, a rear engine attachment, and between the two engine attachments, a thrust force uptake device, a vertical median plane passing through a longitudinal axis of the engine separating the propulsion assembly into two parts, left and right, the thrust force uptake device comprising a main fitting fixed below the pylon and two links which are disposed on either side of the vertical median plane and which each have a front end articulated to the engine and a rear end articulated to the main fitting by a spreader mounted so as to pivot on the main fitting about an axis of rotation which, on the one hand, is orthogonal to a mean plane for transmitting thrust forces parallel to the longitudinal axis of each of the two links, and which, on the other hand, is disposed in the vertical median plane, the longitudinal axes of the two links being convergent in a direction from the front to the rear of the propulsion assembly, a first link being articulated to the spreader by a first connecting pin extending parallel to the mean plane for transmitting thrust forces and perpendicular to the longitudinal axis of the first link, and a second link being articulated to the spreader by a second connecting pin extending parallel to the mean plane for transmitting thrust forces and perpendicular to the longitudinal axis of the second link.

BRIEF DESCRIPTION OF DRAWINGS

The above-mentioned features of the subject matter herein, together with others, will become more clearly apparent upon reading the following description of an example embodiment, the description being given with reference to the appended figures, in which.

DETAILED DESCRIPTION

Figure 2:
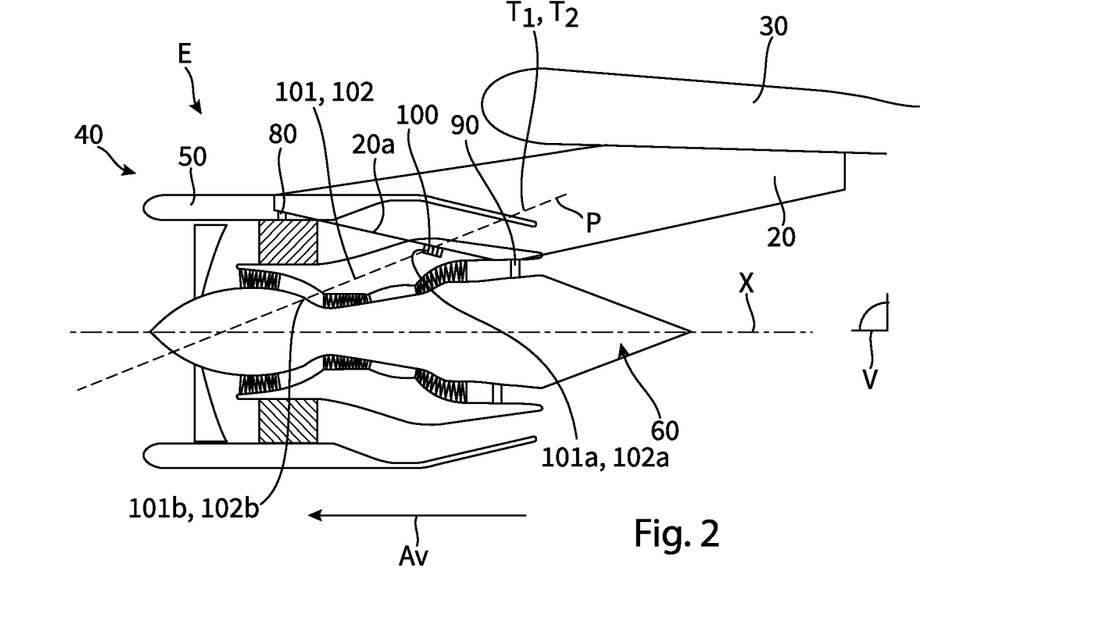
FIG. 2 is a schematic view, in longitudinal section, of a propulsion assembly, attached to a wing of an aircraft, according to the subject matter herein.

In relation to FIG. 2, a propulsion assembly E has a pylon 20 fixed below the wing 30 of an aircraft and a turbomachine 40 having a nacelle 50 which surrounds an engine 60 suspended from the pylon 20. The engine 60 extends from the front to the rear along a longitudinal axis X. The pylon 20 has a planar lower face 20a oriented towards the ground.

In the description, the terms relating to a position are considered with reference to the arrow Av representing the direction of advance of the propulsion assembly/wing through the air under the effect of the thrust provided by the engine 60. The vertical median plane V is the plane which passes through the longitudinal axis X and is orthogonal to the ground (that is to say to the horizontal) and which divides the propulsion assembly E into two parts, left and right (it will be noted that in the example illustrated in the figures, the left and right parts are symmetrical in relation to one another with respect to the vertical median plane V).

The fixing of the engine 60 to the pylon 20 is ensured by an assembly of engine attachments, which are fixed to the pylon 20 and also to the engine 60. These engine attachments comprise, at the front, a front engine attachment 80, at the rear, a rear engine attachment 90, and between the front and rear engine attachments, a thrust force uptake device 100. The front engine attachment 80 and rear engine attachment 90 will not be described in any more detail.

Figure 3:
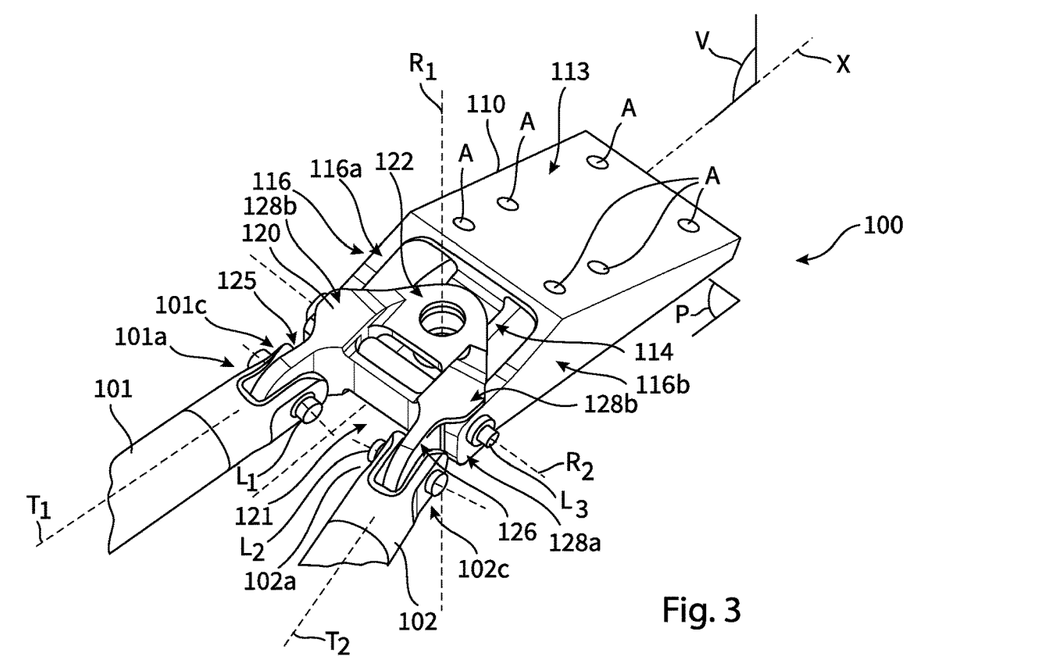
FIG. 3 is a perspective view illustrating a thrust force uptake device of the propulsion assembly shown in FIG. 2, according to one embodiment of the subject matter herein.
Figure 4:
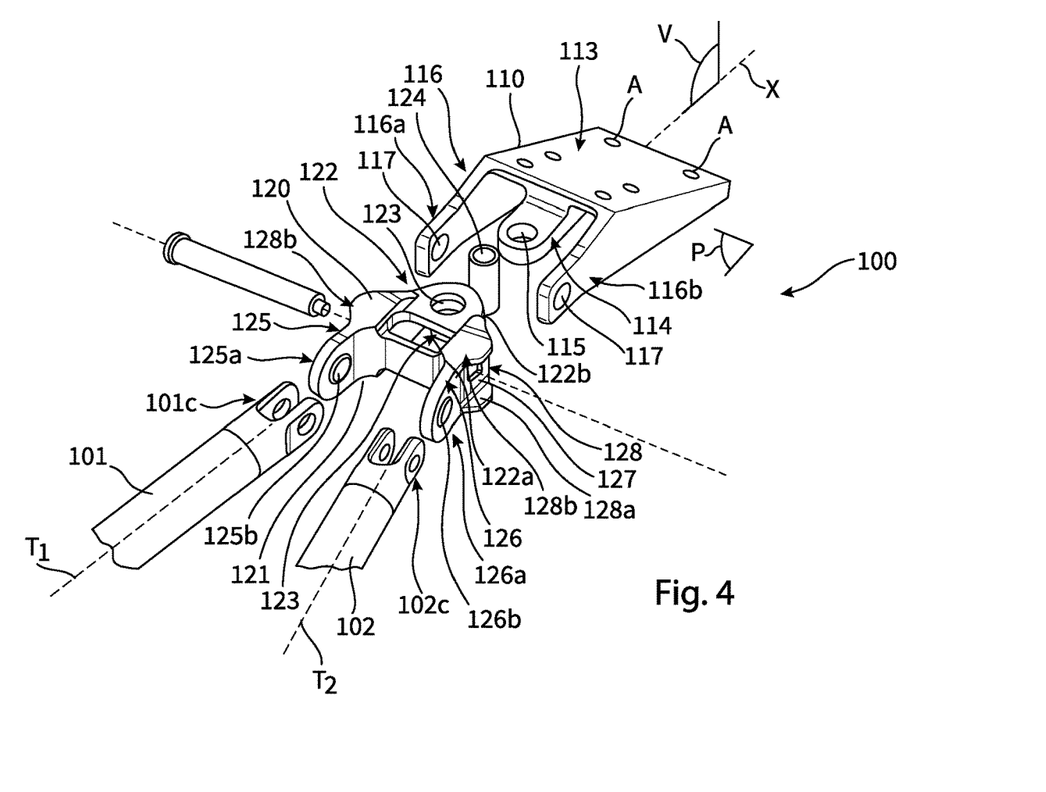
FIG. 4 is an exploded perspective view of the thrust force uptake device in FIG. 3.
Figure 5:
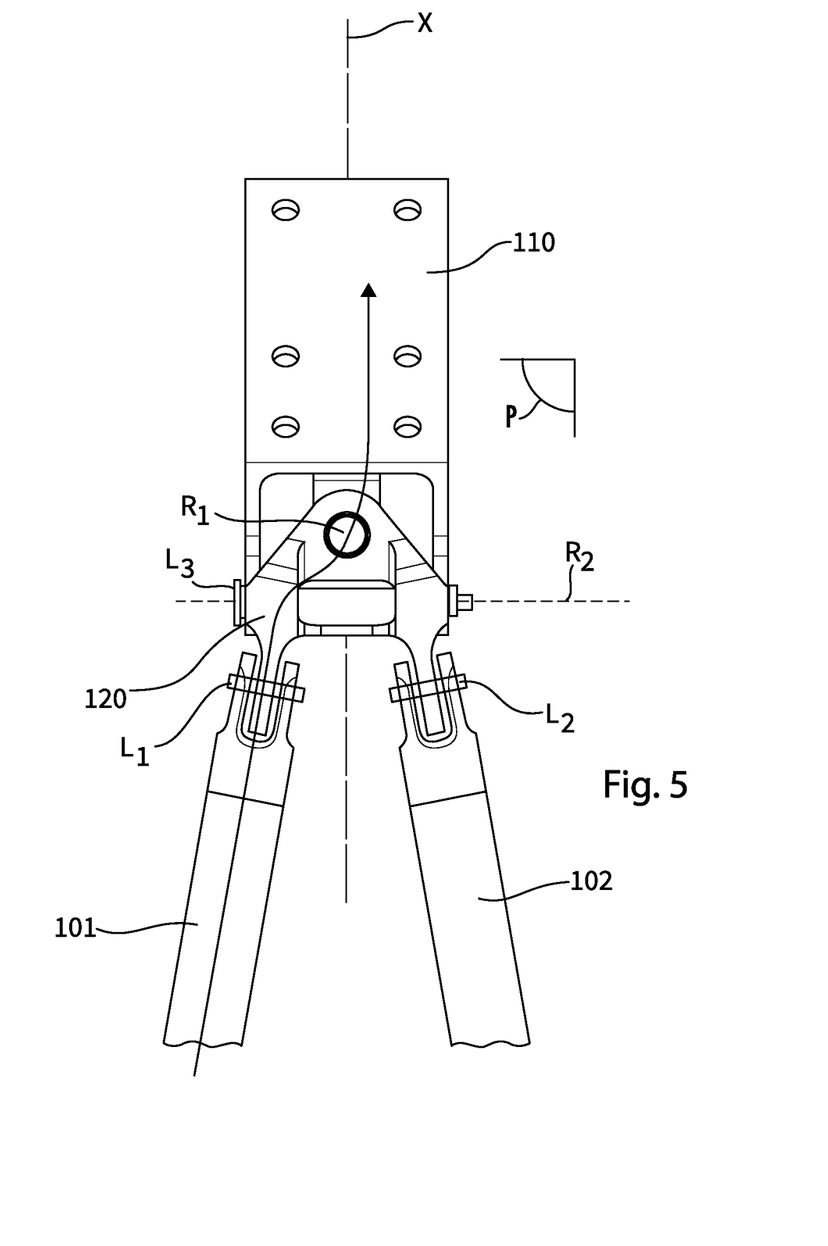
FIG. 5 is a view from above of the thrust force uptake device in FIG. 3, illustrating a main force path in a case of nominal operation of the thrust force uptake device.

With reference to FIGS. 3 through 5, the thrust force uptake device 100 has a main fitting 110 fixed to the lower face 20a of the pylon, a spreader 120 articulated to the main fitting 110, and links 101, 102 for taking up thrust forces of the engine, the links being disposed on either side of the vertical median plane V.

Each link 101, 102 has a front end 101b, 102b articulated to the engine 60 and a rear end 101a, 102a articulated to the spreader 120, and extends longitudinally along an axis T1, T2, referred to as force transmission axis. The two force transmission axes T1, T2 are inclined with respect to the horizontal and get closer to one another in a direction from the front to the rear of the propulsion assembly E (in other words, the axes T1, T2 are convergent in a direction from the front to the rear of the propulsion assembly E). The plane containing the two force transmission axes T1, T2 is called the mean plane P for transmitting thrust forces.

The spreader 120 is mounted so as to pivot on the main fitting 110 with an axis of rotation R1, referred to as main axis, orthogonal to the mean plane P for transmitting thrust forces and comprised in the vertical median plane V.

The spreader 120 comprises two separate connections to the links 101, 102. According to the subject matter herein, the connection between a first and, respectively, second link 101, 102 and the spreader 120 comprises a first and, respectively, second connecting pin L1, L2 extending parallel to the mean plane P for transmitting thrust forces and orthogonally with respect to the force transmission axis T1, T2 of the first and, respectively, second link 101, 102. Such a connection of the spreader 120 to each of the links 101, 102 prevents the generation of out-of-plane forces at each spreader-link interface.

In the detail, the main fitting 110 comprises a planar sole 113 pressed against the lower face 20a of the pylon. The main fitting 110 is fixed to the pylon 20, for example, by the use of four tension screws (not shown) through through-bores A provided for this purpose in the sole 113.

A central flange 114 is arranged at the front of the sole 113 and extends towards the front, parallel to the mean plane P for transmitting thrust forces. A through-bore 115 is made in the central flange 114, and its bore axis is comprised in the vertical median plane V and is perpendicular to the mean plane P for transmitting forces.

The spreader 120 comprises, on a front portion, a fastening interface 121 of the links for the fixation of the links 101, 102, and then, on a rear portion, a clevis 122 for fixing the spreader 120 to the main fitting 110. The spreader 120 has a vertical plane of symmetry perpendicular to the mean plane P for transmitting forces.

The clevis 122 of the spreader 120 is formed by two arms 122a-b which are parallel to one another. Each of the two arms 122a-b comprises a through-bore 123. The bore axes of the bores 123 of the two arms 122a-b are coaxial and the two bores 123 have the same dimensions.

The pivot connection of main axis R1 between the spreader 120 and the main fitting 110 is formed by the arrangement of the central flange 114 of the main fitting 110 between the arms 122a-b of the clevis 122 of the spreader and the fitting of a connecting pin (not shown) in a bearing 124 inserted with a tight fit both in the through-bore 115 of the central flange 114 but also in the bores 123 of the arms 122a-b. When the pivot connection of main axis R1 is operational, the two arms 122a-b of the spreader 120 extend parallel to the mean plane P for transmitting forces.

The fastening interface of the links is formed by two planar fastening tabs 125, 126 extending towards the front of the spreader 120. The two fastening tabs 125, 126 are spaced apart from one another and are symmetrical with respect to the vertical plane of symmetry of the spreader.

Each fastening tab 125, 126 is dedicated to a link 101, 102, is situated on the same side of the vertical median plane V, and extends along the longitudinal axis T1, T2 of the link. Thus, one fastening tab 125 extends along the force transmission axis T1, and the other fastening tab 126 extends along the force transmission axis T2.

In an identical manner for each fastening tab 125, 126, a passage hole 125a, 126a is arranged on the fastening tab. A ball joint ring 125b, 126b is inserted in each passage hole 125a, 126a. In an identical manner for each of the links 101, 102, the fastening tab 125, 126 is inserted between the two parallel arms of a clevis 101c, 102c situated at the rear end 101a, 102a of the link. A connecting pin L1, L2 fitted without play through the clevis 101c, 102c of the link and in the ball joint ring 125b, 126b connects the spreader 120 and the link 101, 102. Each connecting pin L1, L2 thus extends parallel to the mean plane P for transmitting thrust forces and orthogonally with respect to the force transmission axis T1, T2 associated with the link 101, 102.

Furthermore, each connecting pin L1, L2 of a link 101, 102 with the spreader 120 is orthogonal to the main axis R1, and thus substantially parallel to the horizontal. The installation of each thrust link 101, 102 by a horizontally mounted connecting pin L1, L2 significantly increases the access to the connections between the spreader and the links contrary to an installation by vertically mounted pins.

Advantageously, the thrust force uptake device 100 comprises a secondary force uptake interface between the main fitting 110 and the spreader 120. The secondary force uptake interface is activated in the event of breakage of the main force uptake interface, that is to say of the pivot connection of main axis R1.

The secondary force uptake interface, situated between the fastening interface 121 of the links and the pivot connection of main axis R1, is formed by a pivot connection of axis of rotation R2, referred to as secondary axis, comprised in the mean plane P for transmitting forces and orthogonal to the main axis R1. The secondary axis R2 is thus substantially parallel to the horizontal.

In order to realize the secondary force uptake interface, the main fitting 110 comprises a clevis 116 formed by two arms 116a-b which are distributed on either side of the central flange 114 and are symmetrical in relation to one another with respect to the vertical median plane V. Each of the two arms 116a-b extends along a plane parallel to the vertical median plane V. Each arm 116a-b comprises an orifice 117 of circular shape, and the orifices of the two arms 116a-b are identical and coaxial.

A connecting pin L3, referred to as waiting connecting pin, is mounted with play on the clevis 116 of the central fitting 110 by insertion in each of the two orifices 117 and inserted, with a tight fit, through the spreader 120. In the detail, the waiting connecting pin L3 is inserted through two coaxial orifices 127 of the spreader 120, wherein each orifice 127 is arranged on a flank 128 (only one is visible in FIG.

4) of the spreader 120. The two orifices 127 are thus arranged on two opposite flanks of the spreader 120, and these two flanks 128 are arranged between the two arms 116a-b of the central fitting 110. There is thus one flank 128 facing each of the arms 116a-b.

In the embodiment of the subject matter herein shown in FIGS. 3 and 4, the two opposite flanks 128 extend parallel to one another, and each flank 128 is extended, at the front of the spreader 120, by a fastening tab 125, 126 of the fastening interface 121 of the links.

At each of the flanks 128, each orifice 127 is flanked by two edges 128a-b protruding, extending along parallel planes, towards the exterior of the spreader 120 and perpendicularly with respect to the vertical plane of symmetry of the spreader.

On each side of the spreader 120, the clevis arm 116a-b of the main fitting 110 is received between the two protruding edges 128a-b, but is not in contact with the latter as long as the main force uptake interface is operational. Functional play is provided such that, when the main force uptake interface is operational, the smallest distance between an arm 116a-b and a protruding edge 128a-b is of the order of a few millimetres (example: 2 to 3 mm), and also the smallest distance between an arm 116a-b and the flank 128 of the spreader is also of the order of a few millimetres (example: 2 to 3 mm).

The protruding edges 128a-b act as an end stop for limiting the rotational movement of the spreader 120 with respect to the main fitting 110 when the secondary force uptake interface is activated as will be explained below.

In the case of nominal operation of the thrust force uptake device (FIG. 5), the spreader 120 can pivot in the mean plane P for transmitting forces in order to take up the forces of the engine 60 that are transmitted by the links 101, 102. The angular amplitude of the rotation is limited, on each side of the vertical median plane V, by the arm 116a-b of the fitting.

In this case, the force path, referred to as main force path, passes successively from each link 101, 102, to the spreader 120, then to the main fitting 110 and finally to the pylon 20. The passage of force between the spreader 120 and the main fitting 110 is effected through the tight pivot connection of main axis R1. In FIG. 5, the arrowhead line shows the main force path for one link 101. The main force path for the other link 102 would be symmetrical thereto.

Figure 6:
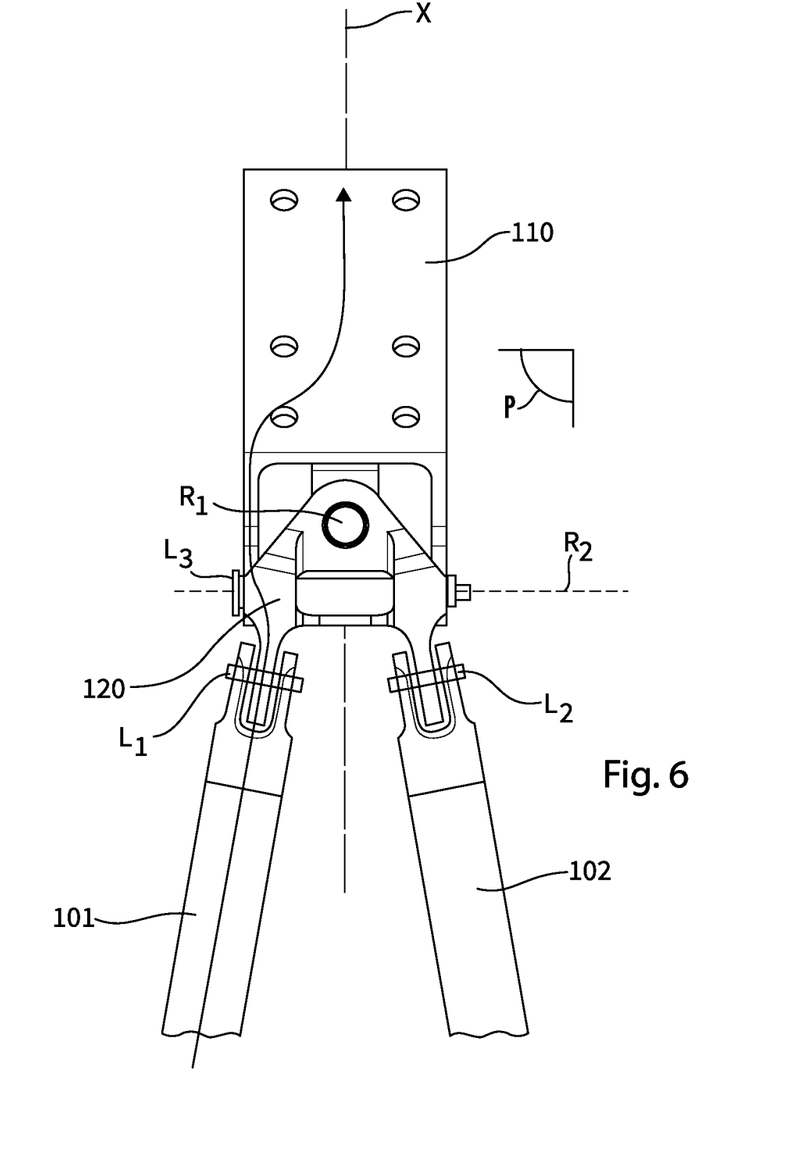
FIG. 6 is a view similar to that in FIG. 5, illustrating a secondary force path activated in a first case of failure of the thrust force uptake device.

In the event of breakage of the main force uptake interface, the spreader 120 will move under the weight of the engine 60 along the mean plane P for transmitting forces until the play between the waiting connecting pin L3 and the arms 116a-b of the main fitting 110 is removed. After the play has been removed, the spreader 120 is blocked in rotation about the main axis R1 and free in rotation about the secondary axis R2 with a rotational amplitude limited by the protruding edges 128a-b of the flanks 128. The amplitude of the oscillations of the spreader 120 about the secondary axis R2 is therefore limited so as not to damage the components.

In this case, the force path, referred to as secondary force path, passes successively from each link 101, 102, to the spreader 120, to the main fitting 110 and finally to the pylon 20. The passage of force between the spreader 120 and the main fitting 110 is effected through the waiting connecting pin L3. In FIG. 6, the arrowhead line shows the secondary force path for one link 101 in the event of a breakage of the main force uptake interface. The secondary force path for the other link 102 would be symmetrical thereto.

By virtue of the design of the connecting pin system, the links 101, 102 are always prevented from moving in translation with respect to the spreader 120 since, in the event of breakage of the main force uptake interface, the waiting connecting pin L3 is applied.

Figure 7:
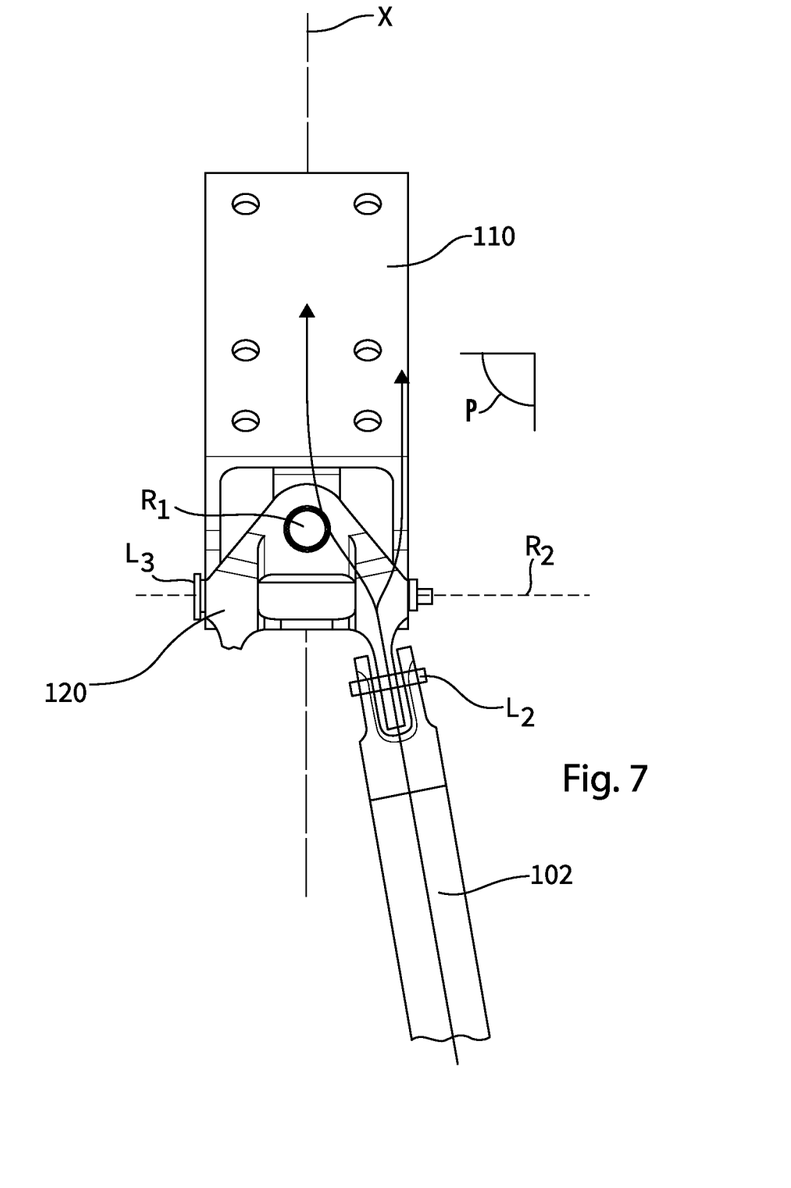
FIG. 7 is a view similar to that in FIG. 5, illustrating another secondary force path activated in a second case of failure of the thrust force uptake device.

In the event of breakage of a link-spreader interface (that is to say breakage of a fastening tab 125, 126 or of a connecting pin L1, L2 between a link 101, 102 and a fastening tab 125, 126 on one side of the vertical median plane V), the spreader 120 is no longer balanced, and this will cause it to rotate about the main axis R1. On that side of the vertical median plane V where the link-spreader interface is unbroken, the spreader 120 will move towards the front along the mean plane P for transmitting forces until the play between the waiting connecting pin L3 and the arm of the central fitting 110 is removed.

In this case, all of the forces of the engine 60 travel solely on that side of the vertical median plane V where the link-spreader interface is unbroken. In FIG. 7, the arrowhead line shows the force path which passes successively from the link 102 to the spreader 120 through the unbroken link-spreader interface, to the main fitting 110 and then finally to the pylon 20. The passage of force between the link and the main fitting 110 is effected through the pivot connection of main axis R1 and the pivot connection of secondary axis R2.

Although the subject matter herein has been described for the case in which the rear engine attachment 90 and the thrust force uptake device 100 are distinct and separate from one another, another configuration is possible, without departing from the scope of the subject matter herein, in which the main fitting 110 of the thrust force uptake device 100 is integral with the rear engine attachment 90 (example: one and the same component fulfils the function of the rear engine attachment and of the thrust force uptake device).

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
   an engine suspended below a pylon by engine attachments comprising, at a front, a front engine attachment, at a rear, a rear engine attachment, and between the two engine attachments, a thrust force uptake device, a vertical median plane passing through a longitudinal axis of the engine separating the propulsion assembly into two parts, left and right, the thrust force uptake device comprising a main fitting fixed below the pylon and two links disposed on either side of the vertical median plane and which each have a front end articulated to the engine and a rear end articulated to the main fitting by a spreader mounted to pivot on the main fitting about an axis of rotation which is orthogonal to a mean plane for transmitting thrust forces parallel to the longitudinal axis of each of the two links, and which is disposed in the vertical median plane, the longitudinal axes of the two links being convergent in a direction from the front to the rear of the propulsion assembly, wherein a first link is articulated to the spreader by a first connecting pin extending parallel to the mean plane for transmitting thrust forces and perpendicular to the longitudinal axis of the first link, and wherein a second link is articulated to the spreader by a second connecting pin extending parallel to the mean plane for transmitting thrust forces and perpendicular to the longitudinal axis of the second link, and wherein the spreader comprises two fastening tabs for fastening the links to the spreader, with a first fastening tab associated with the first link and a second fastening tab associated with the second link, wherein each fastening tab associated with a link extends parallel to the longitudinal axis of the link.

2. The propulsion assembly according to claim 1, wherein a waiting connecting pin, which is orthogonal to the axis of rotation and which passes through the spreader is mounted without play on the spreader and mechanically connects the spreader to the main fitting with play by two arms which are distributed symmetrically on either side of the vertical median plane and between which the spreader is arranged.

3. The propulsion assembly according to claim 2, wherein the waiting connecting pin is inserted through two coaxial orifices of the spreader, the orifices being arranged in each of the two opposite flanks of the spreader, the flanks being arranged between the two arms of the central fitting.

4. The propulsion assembly according to claim 3, wherein the two opposite flanks extend parallel to one another.

5. The propulsion assembly according to claim 1, wherein the thrust force uptake device and the rear engine attachment are separate.

* * * * *